(12) United States Patent
Lee et al.

(10) Patent No.: US 11,277,008 B2
(45) Date of Patent: Mar. 15, 2022

(54) ENERGY STORAGE SYSTEM

(71) Applicant: LSIS CO., LTD., Anyang-si (KR)

(72) Inventors: Ji-Heon Lee, Anyang-si (KR); Dong-Jin Yun, Anyang-si (KR); Yun-Jae Lee, Anyang-si (KR); Min-Jae Kim, Anyang-si (KR); Ji-Hong Kim, Anyang-si (KR)

(73) Assignee: LSIS CO., LTD., Anyang-si (KR)

( * ) Notice: Subject to any disclaimer, the term of this patent is extended or adjusted under 35 U.S.C. 154(b) by 144 days.

(21) Appl. No.: 16/622,647

(22) PCT Filed: Apr. 20, 2018

(86) PCT No.: PCT/KR2018/004592
§ 371 (c)(1),
(2) Date: Dec. 13, 2019

(87) PCT Pub. No.: WO2018/230831
PCT Pub. Date: Dec. 20, 2018

(65) Prior Publication Data
US 2020/0169089 A1 May 28, 2020

(30) Foreign Application Priority Data
Jun. 14, 2017 (KR) .......................... 10-2017-0074786

(51) Int. Cl.
*H02J 3/32* (2006.01)
*H02J 9/06* (2006.01)
*H02J 7/00* (2006.01)

(52) U.S. Cl.
CPC .............. *H02J 3/32* (2013.01); *H02J 7/0048* (2020.01); *H02J 7/0063* (2013.01);
(Continued)

(58) Field of Classification Search
CPC ........ H02J 3/32; H02J 7/0048; H02J 7/00712; H02J 7/0063; H02J 7/0068; Y02B 70/30; Y02B 70/3225; Y04S 20/222
See application file for complete search history.

(56) References Cited

U.S. PATENT DOCUMENTS 9,065,277 B1 6/2015 Kim et al.
9,800,051 B2 * 10/2017 Laubenstein ........... H02J 3/386
(Continued)

FOREIGN PATENT DOCUMENTS

JP 2012034534 A 2/2012
JP 2012050167 A 3/2012
(Continued)

OTHER PUBLICATIONS

International Search Report for related International Application No. PCT/KR2018/004592; dated Dec. 20, 2018; (3 pages).
(Continued)

*Primary Examiner* — Rexford N Barnie
*Assistant Examiner* — Elim Ortiz
(74) *Attorney, Agent, or Firm* — K&L Gates LLP

(57) ABSTRACT

The energy storage system according to one embodiment comprises a first converter connected between the system and the DC distribution network, and converting an AC voltage of the system into a DC voltage and transmitting the DC voltage to the DC distribution network; a second converter connected to the DC distribution network and controlling the voltage of the DC distribution network; a battery connected to the second converter and of which the charging and discharging are controlled by the second converter; a third converter connected to the DC distribution network; and a first load connected to the third converter and of which the voltage is controlled by means of the third converter, wherein the first converter generates a power control instruc-
(Continued)

tion for controlling at least one of the battery and the first load on the basis of SOC information of the battery and power consumption information of the first load.

8 Claims, 5 Drawing Sheets

(52) U.S. Cl.
CPC ........ *H02J 7/0068* (2013.01); *H02J 7/00712* (2020.01); *H02J 9/06* (2013.01)

(56) References Cited

U.S. PATENT DOCUMENTS

| | | |
|---|---|---|
| 9,853,452 B2 | 12/2017 | Nakai et al. |
| 10,175,660 B2 | 1/2019 | Kanayama et al. |
| 2003/0222618 A1 | 12/2003 | Kanouda et al. |
| 2009/0200868 A1 | 8/2009 | Christensen et al. |
| 2011/0273022 A1* | 11/2011 | Dennis ............... H02J 1/10 307/72 |
| 2013/0111252 A1* | 5/2013 | Yoshida ............... G06F 1/30 713/340 |
| 2017/0085122 A1 | 3/2017 | Nasiri et al. |

FOREIGN PATENT DOCUMENTS

| | | | |
|---|---|---|---|
| JP | 2014075878 | A | 4/2014 |
| JP | 2014131425 | A | 7/2014 |
| JP | 2015192485 | A | 11/2015 |
| JP | 2016092898 | A | 5/2016 |
| KR | 20060125282 | A | 12/2006 |
| KR | 20100007166 | A | 1/2010 |
| KR | 20100131342 | A | 12/2010 |
| KR | 20100132008 | A | 12/2010 |
| KR | 20110055389 | A | 5/2011 |
| KR | 20140093371 | A | 7/2014 |
| KR | 101450711 | B1 | 10/2014 |
| KR | 20160097865 | A | 8/2016 |
| WO | 2012014273 | A1 | 2/2012 |

OTHER PUBLICATIONS

Written Opinion for related International Application No. PCT/KR2018/004592; dated Dec. 20, 2018; (5 pages).
Extended European Search Report for related European Application No. 18817148.2; dated Apr. 2, 2020; (8 pages).
Korean Office Action for related Korean Application No. 10-2017-0074786; dated Apr. 24, 2020; (5 pages).
Japanese Office Action for related Japanese Application No. 2019-568334; dated Dec. 18, 2020; (4 pages).
Korean Notice of Allowance for related Korean Application No. 10-2020-0179858; action dated Nov. 12, 2021; (2 pages).
Japanese Office Action for related Japanese Application No. 2019-568334; action dated Sep. 24, 2021; (3 pages).

* cited by examiner

ENERGY STORAGE SYSTEM

CROSS-REFERENCE TO RELATED APPLICATIONS

The present application is a National Stage of International Application No. PCT/KR2018/004592, filed on Apr. 20, 2018, which claims the benefit of earlier filing date and right of priority to Korean Application No. 10-2017-0074786, filed on Jun. 14, 2017, the contents of which are all hereby incorporated by reference herein in their entirety.

FIELD OF THE INVENTION

The present disclosure relates to an energy storage system having seamless power supply.

BACKGROUND OF THE INVENTION

An energy storage system stores energy as produced into each linked system including power plants, substations and transmission lines, and then uses the power selectively and efficiently when necessary to increase energy efficiency.

The energy storage system may level an electric load with large fluctuations in time and season to improve an overall load rate to lower a cost of generating electricity. In addition, investment costs required for power facility expansion and operation costs thereof can be reduced, thereby reducing an electric bill and saving energy.

The energy storage system may be installed and used in a power generation plant, a transmission and distribution station, and houses in a power system for functions such as frequency regulation, stabilization of generator output using renewable energy, peak shaving, load leveling and emergency power.

In addition, the energy storage system may be divided into a physical energy storage system and a chemical energy storage system. The physical energy storage may use pumping, compressed air storage, flywheel, etc. The chemical energy storage may use a lithium ion battery, a lead acid battery, a Nas battery, and the like.

However, in order to enable seamless power supply of the energy storage system, an existing diesel generator may perform an emergency power generation function. In this case, there is a problem that expensive emergency transfer switch and algorithm are required for seamless transfer of the diesel generator.

The existing energy storage system is designed to have one direction, and is free of a power exchanging algorithm and thus has a problem that power exchanging between the existing energy storage system and a power system is impossible.

BRIEF SUMMARY OF THE INVENTION

One purpose of the present disclosure is to provide an energy storage system capable of performing the seamless power supply and of exchanging power with a power system via constant charge/discharge control of a battery.

One aspect of the present disclosure provides an energy storage system for managing a power of a power system and a power of a direct current (DC) distribution network connected to the power system, wherein the energy storage system includes: a first converter connected to and disposed between the power system and the DC distribution network, wherein the first converter is configured for converting a alternating current (AC) voltage of the power system into a DC voltage and delivering the DC voltage to the DC distribution network; a second convertor connected to the DC distribution network, wherein the second converter is configured for controlling a voltage of the DC distribution network; a battery connected to the second converter, wherein charge and discharge of the battery are controlled by the second converter; a third converter connected to the DC distribution network; and a first load connected to the third converter, wherein a voltage of the first load is controlled by the third converter, wherein the first converter is configured to generate a power control command for controlling at least one of the battery or the first load based on SOC (state of charge) information of the battery and consumption power information of the first load.

In one implementation, the energy storage system further includes: a communicator configured for: receiving the SOC information of the battery and the consumption power information of the first load from the second converter and the third converter, respectively, and transmitting the SOC information and consumption power information to the first converter; and receiving the power control command from the first converter and transmitting the power control command to at least one of the second converter and the third converter; and a main controller for controlling and monitoring the first to third converters through the communicator.

In one implementation, the energy storage system further includes: a fourth converter connected to the DC distribution network; and a second load connected to the fourth converter, wherein a voltage of the second load is controlled by the fourth converter.

In one implementation, the fourth converter transmits consumption power information of the second load to the communicator, wherein the communicator transmits the consumption power information of the second load to the first converter, wherein the first converter is configured to generate a power control command for controlling at least one of the battery, the first load, or the second load based on the SOC information of the battery, the consumption power information of the first load, and the consumption power information of the second load, wherein the communicator is configured to receive the power control command for controlling at least one of the battery, the first load, or the second load from the first converter, and to transmit the power control command to at least one of the second to fourth converters, wherein a main controller controls and monitors the fourth converter.

In one implementation, the second converter is configured to convert a DC voltage provided from the DC distribution network into a DC voltage and supply the converted DC voltage to the battery, or to convert a DC voltage provided from the battery into a DC voltage and supply the converted DC voltage to the DC distribution network, wherein the third converter is configured to convert a DC voltage provided from the DC distribution network to a DC voltage and supply the converted DC voltage to the first load, wherein the fourth converter is configured to convert a DC voltage provided from the DC distribution network into an AC voltage and supply the converted AC voltage to the second load.

In one implementation, when the first converter is driven in a battery charge and discharge mode while the first converter is connected to the power system, the first converter is configured to analyze the SOC information of the battery provided from the communicator and determine whether the SOC of the battery is within a predefined limit range, wherein the first converter is configured to generate the power control command based on the determination result.

In one implementation, upon determination that the SOC of the battery is within the predefined limit range, the first converter is configured: to generate the power control command based on charge or discharge power of the battery and the consumption power of the first load; to deliver the generated power control command to the second converter and the third converter via the communicator; and to perform power control of the power system based on the generated power control command.

In one implementation, upon determination that the SOC of the battery is out of the predefined limit range, the first converter is configured: to operate in a normal mode to create the power control command based on the consumption power of the first load; to transfer the generated power control command to the third converter via the communicator; and to perform power control of the power system based on the generated power control command.

In one implementation, when a failure occurs in the power system, the first converter is configured to stop operation thereof, and the second converter is configured to supply the power from the battery to the first load in a seamless manner.

As mentioned above, according to the present disclosure, the energy storage system may realize the seamless power supply and may trade power with the power system via the constant charge/discharge control of the battery. Thus, the power consumption may be controlled in an efficient manner and the seamless high quality power supply may be realized.

In addition to the effects as described above, specific effects of the present disclosure will be described together with detailed descriptions for carrying out the present disclosure.

DETAILED DESCRIPTION OF THE INVENTION

Figure 1:
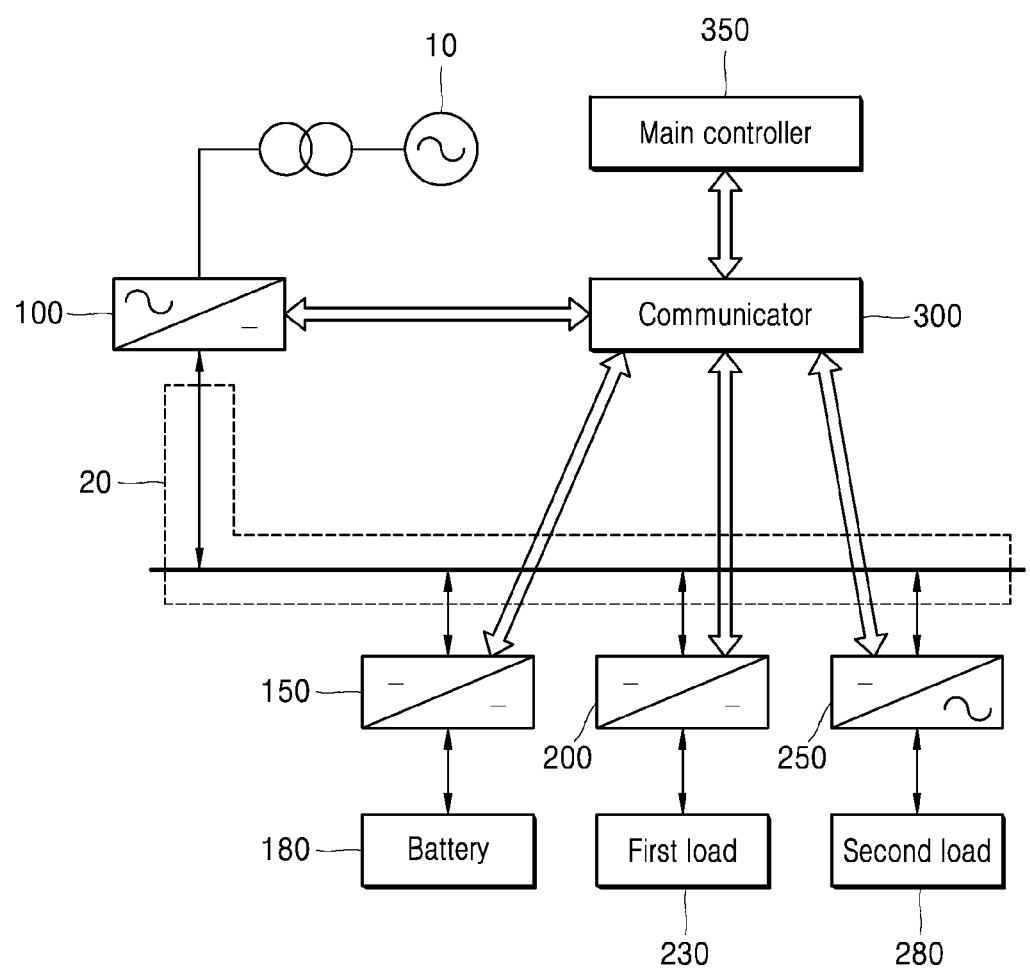
FIG. 1 is a schematic diagram illustrating an energy storage system according to an embodiment of the present disclosure.

The above objects, features and advantages are described in detail below with reference to the accompanying drawings. Accordingly, a person having ordinary knowledge in the technical field to which the present disclosure belongs may easily implement a technical idea of the present disclosure. In describing the present disclosure, detailed descriptions of known components or methods related to the present disclosure will be omitted when it is determined that they may unnecessarily obscure a gist of the present disclosure. Hereinafter, exemplary embodiments of the present disclosure will be described in detail with reference to the accompanying drawings. In the drawings, the same reference numerals are used to indicate the same or similar components.

Hereinafter, an energy storage system according to an embodiment of the present disclosure will be described with reference to FIGS. 1 to 5.

Figure 2:
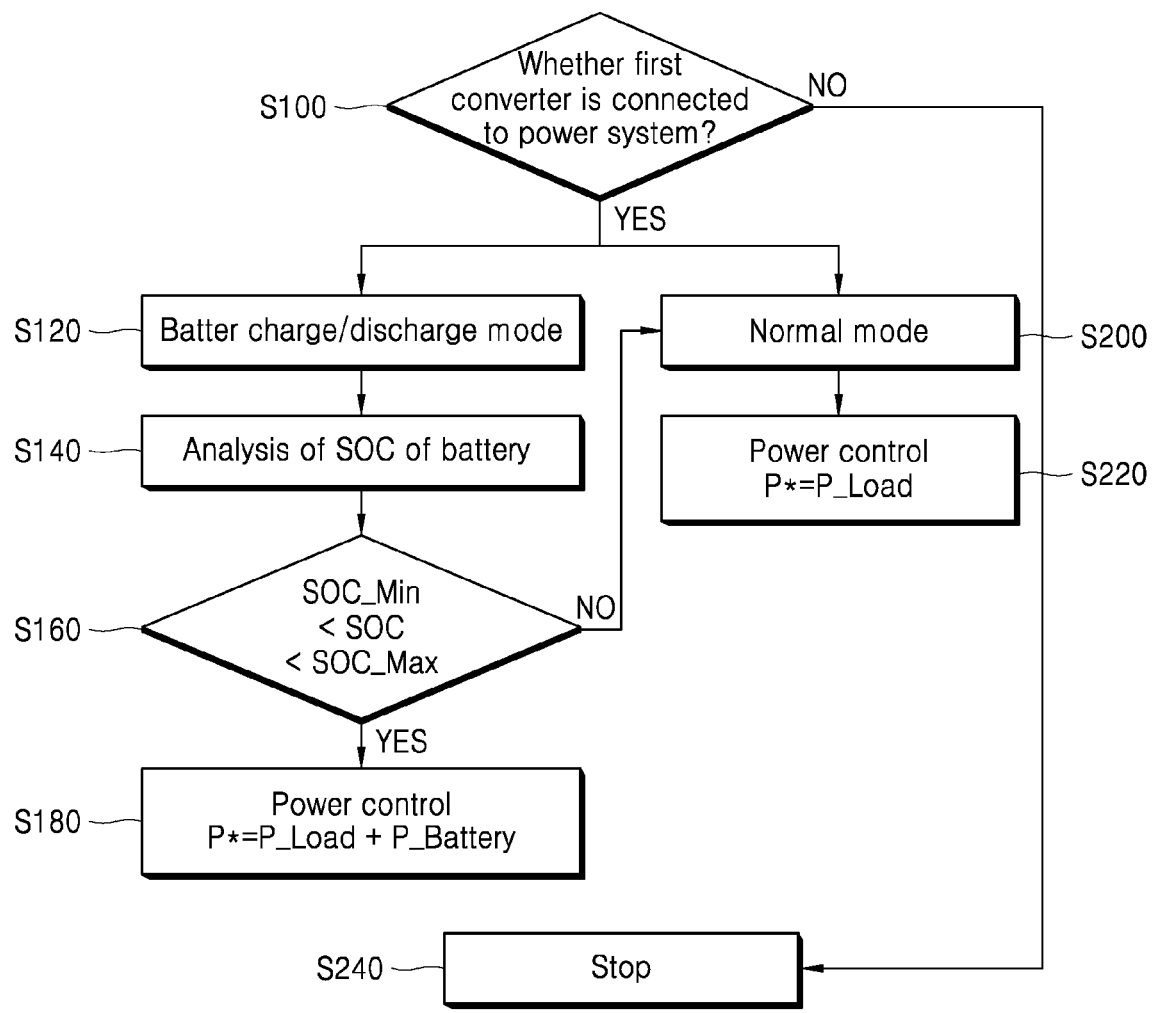
FIG. 2 is a flow chart illustrating a control flow of the energy storage system of FIG. 1.
Figure 3:
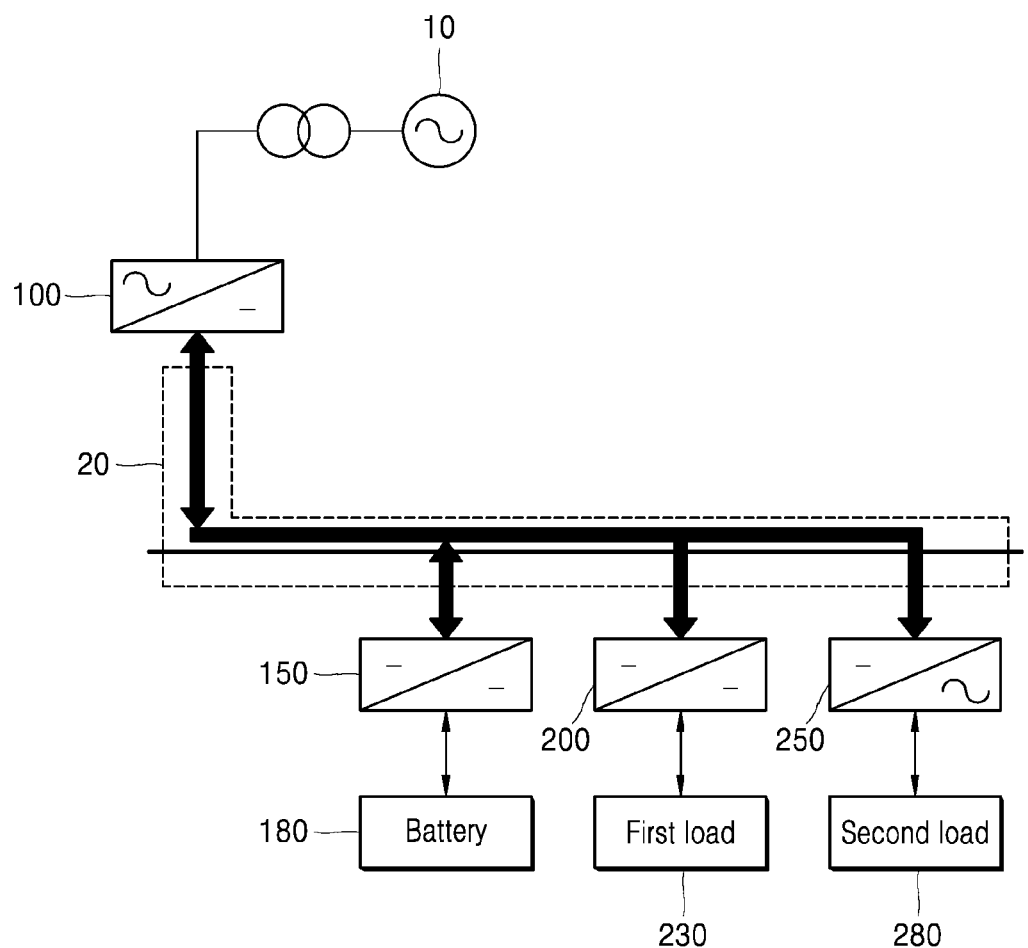
FIG. 3 is a schematic diagram illustrating an example of a power flow by the energy storage system of FIG. 1 when connecting to a power system.
Figure 4:
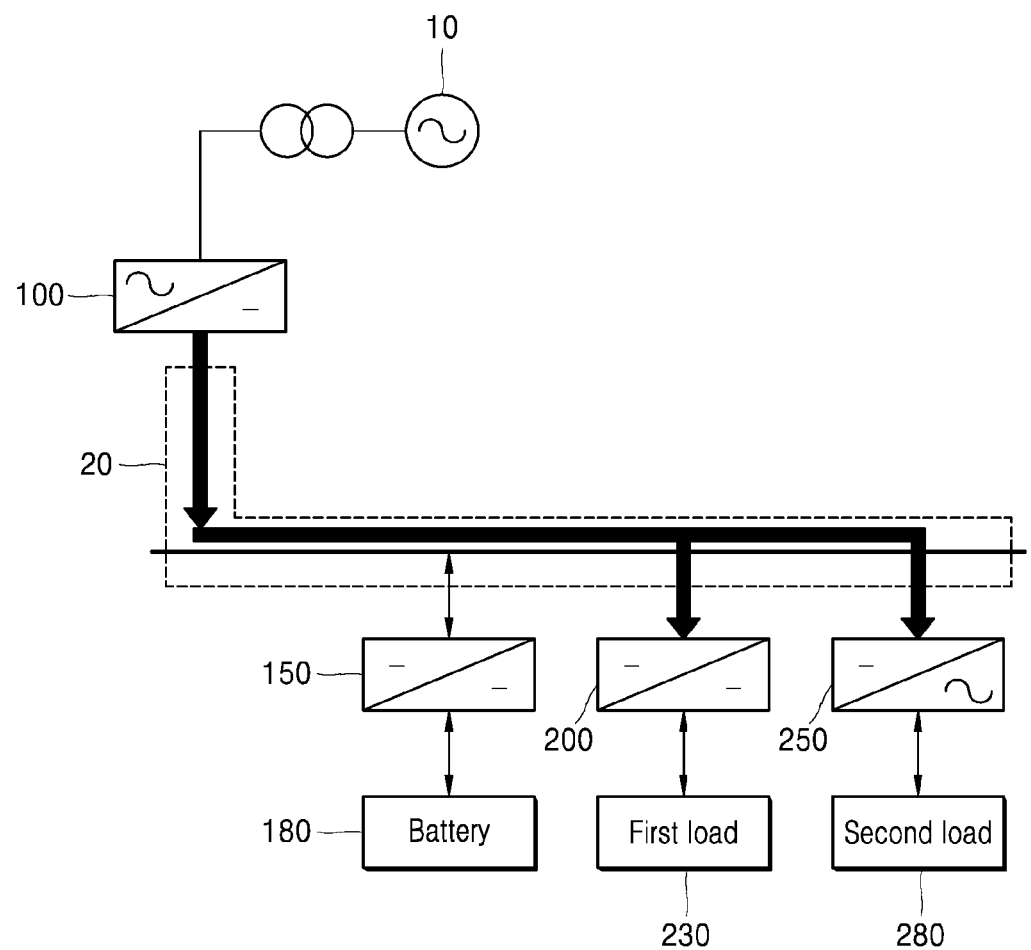
FIG. 4 is a schematic diagram illustrating another example of a power flow by the energy storage system of FIG. 1 when connecting to a power system.
Figure 5:
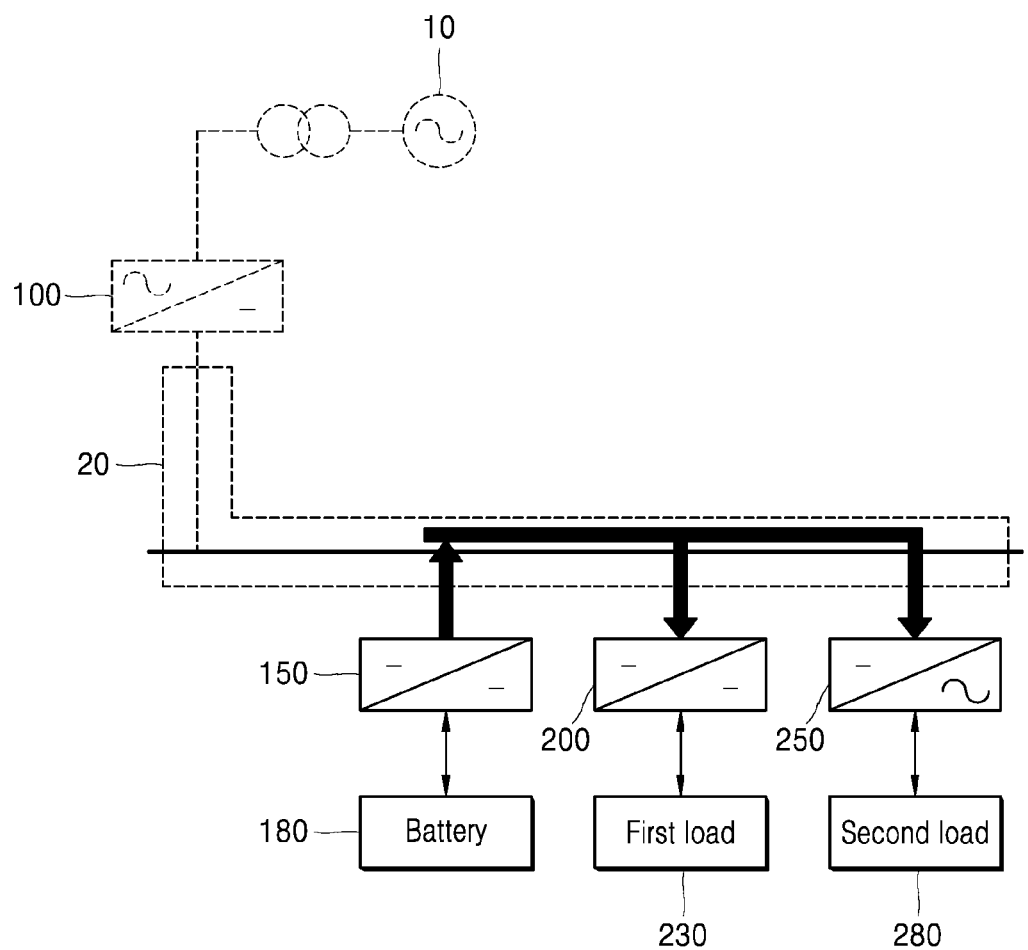
FIG. 5 is a schematic diagram illustrating an example of a power flow by the energy storage system of FIG. 1 when a power system accident occurs.

FIG. 1 is a schematic diagram illustrating an energy storage system according to an embodiment of the present disclosure. FIG. 2 is a flow chart illustrating a control flow of the energy storage system of FIG. 1. FIG. 3 is a schematic diagram illustrating an example of a power flow by the energy storage system of FIG. 1 when connecting to a power system. FIG. 4 is a schematic diagram illustrating another example of a power flow by the energy storage system of FIG. 1 when connecting to a power system. FIG. 5 is a schematic diagram illustrating an example of a power flow by the energy storage system of FIG. 1 when a power system accident occurs.

First, referring to FIG. 1, an energy storage system according to an embodiment of the present disclosure may manage power of a power system 10 and a DC distribution network (i.e., a DC power system) connected to the power system 10.

In detail, the energy storage system according to the present disclosure may include a first converter 100, a second converter 150, a battery 180, a third converter 200, a first load 230, a fourth converter 250, a second load 280, a communicator 300, a main controller 350.

For reference, the energy storage system may include not only the power system 10 and the DC distribution network 20 but also a distributed power system (not shown). The energy storage system may further include an additional load in addition to the first load 230 and the second load 280 or only one of the first load 230 and second load 280.

However, for convenience of description, in the present disclosure, one example where the energy storage system includes the first converter 100, the second converter 150, the battery 180, the third converter 200, the first load 230, the fourth converter 250, the second load 280, the communicator 300 and the main controller 350 will be described.

The first converter 100 may be connected to and disposed between the power system 10 and DC distribution network 20 and may convert an AC voltage of the power system 10 into a DC voltage and transfer the DC voltage to the DC distribution network 20. In another example, the first converter 100 may convert the DC voltage of the DC distribution network 20 into an AC voltage and transmit the same to the power system 10.

Accordingly, the first converter 100 may be embodied as an AC-DC converter.

In detail, the first converter 100 may be configured to generates a power control command to control at least one of the battery 180, the first load 230, and the second load 280 based on SOC (state of charge) information of the battery 180, power consumption information of the first load 230, and power consumption information of the second load 280.

That is, the first converter 100 may receive the SOC information of the battery 180, power consumption information of the first load 230, and power consumption information of the second load 280 from the communicator 300 in real time and then may generate the power control command for controlling at least one or more of the battery 180, the first load 230, and the second load 280 based on the SOC information of the battery 180, power consumption information of the first load 230, and power consumption information of the second load 280 as received.

Further, the first converter 100 may transmit the generated power control command to the communicator 300.

The second converter 150 may be connected to the DC distribution network 20 and may control a voltage of the DC distribution network 20.

In detail, the second converter 150 may control charging and discharging of the battery 180 as well as the voltage of the DC distribution network 20.

That is, the second converter 150 may convert the DC voltage provided from the DC distribution network 20 to the DC voltage and provide the same to the battery 180 or convert the DC voltage provided from the battery 180 to the DC voltage and provide the DC voltage to the DC distribution network 20.

Accordingly, the second converter 150 may be embodied as a DC-DC converter.

Further, the second converter 150 may detect the SOC of the battery 180 and transmit the SOC information of the battery 180 to the communicator 300 and may receive the power control command generated by the first converter 100 from the communicator 300.

Further, the second converter 150 may control the charge/discharge of the battery 180 based on the received power control command.

The third converter 200 may be connected to the DC distribution network 20, and may control the voltage of the first load 230.

In detail, the third converter 200 may convert the DC voltage provided from the DC distribution network 20 into a DC voltage and provide the same to the first load 230. That is, the third converter 200 may control a power state of the first load 230.

Accordingly, the third converter 200 may be embodied as a DC-DC converter. The first load 230 may be embodied as a DC load.

Further, the third converter 200 may detect the power consumption of the first load 230, that is, the required power thereof, and transmit the power consumption information of the first load 230 to the communicator 300. The third converter 200 may receive the power control command generated by the first converter 100 from the communicator 300.

Further, the third converter 200 may control the voltage or power of the first load 230 based on the received power control command.

The fourth converter 250 may be connected to the DC distribution network 20, and may control the voltage of the second load 280.

In detail, the fourth converter 250 may convert the DC voltage provided from the DC distribution network 20 into an AC voltage and provide the converted AC voltage to the second load 280. That is, the fourth converter 250 may control the power state of the second load 280.

Accordingly, the fourth converter 250 may be embodied as a DC-AC converter, while the second load 280 may be embodied as an AC load.

Further, the fourth converter 250 may detect the consumption power of the second load 280, that is, the required power thereof, and transmit the consumption power information of the second load 280 to the communicator 300. The fourth converter 250 may receive the power control command generated by the first converter 100 from the communicator 300.

Further, the fourth converter 250 may control the voltage or power of the second load 280 based on the received power control command.

The battery 180 may be connected to the second converter 150. Charge and discharge of the battery 180 may be controlled by the second converter 150.

Further, the battery 180 may be composed of at least one or more battery cells. Each battery cell may include a plurality of bare cells.

The first load 230 may be connected to the third converter 200. The voltage, that is, power of the first load 230 may be controlled by the third converter 200.

Further, the first load 230 may be embodied as a DC load in one example.

The second load 280 may be connected to the fourth converter 250. The voltage, that is, power thereof may be controlled by the fourth converter 250.

Further, the second load 280 may be embodied as an AC load in one example.

The communicator 300 may receive the SOC information of the battery 180, consumption power information of the first load 230, and consumption power information of the second load 280 from the second converter 150, the third converter 200, and the fourth converter 250, respectively.

Specifically, the communicator 300 may be implemented in a high-speed communication manner, for example, using a CAN (Controller Area Network). The first to fourth converters 100, 150, 200, 250, and the main controller 350 may communicate with the communicator 300 in a wired manner or wirelessly.

Further, the communicator 300 may receive the SOC information of the battery 180, consumption power information of the first load 230, and consumption power information of the second load 280 from the second converter 150, the third converter 200, and the fourth converter 250, respectively, and transmits them to the first converter 100. The communicator 300 may receive the power control command from the first converter 100 and transmit the same to at least one or more of the second to fourth converters 150, 200, and 250.

For reference, the energy storage system according to the present disclosure may not include the communicator 300. That is, the first converter 100 and the second to fourth converters 150, 200 and 250 may communicate directly with each other, or the main controller 350 may directly communicate with the first to fourth converters 100, 150, 200 and 250 without a separate communicator.

However, for convenience of description, in the present disclosure, the example where the energy storage system includes the communicator 300 will be described.

The main controller 350 may control and monitor the first to fourth converters 100, 150, 200, and 250 through the communicator 300.

In detail, the main controller 350 may be embodied as, for example, a PLC (programmable logic controller) or an EMS (energy management system). The main controller 350 may communicate with each component, for example, each of the first to the fourth converter 100, 150, 200, and 250, as well as the power system 10, battery 180, first load 230, second load 280 via communicator 300 and then determine the current operating state thereof. Further, the main controller 350 may control all sequence operations of the energy storage system and may issue a command to each component based on each situation.

However, in accordance with the present disclosure, the main controller 350 may not perform a function and a role overlapping with those of the first to fourth converters 100, 150, 200, and 250.

Thus, circuitry and components of the main controller 350 may be simpler and complexity of the communication connection may be reduced, such that not only the interference to the communication signal is reduced but also the probability of error occurring during operation may be reduced.

Accordingly, performance and reliability of the energy storage system may be improved.

Subsequently, referring to FIG. 2 to FIG. 5, the control flow of the energy storage system of FIG. 1 and the power flow by the energy storage system will be shown.

Specifically, the control flow of the first converter 100 in the energy storage system and corresponding power flow are shown.

First, the first converter 100 may determine whether the power system 10 is connected thereto S100.

In detail, when the power system 10 is connected thereto, the first converter 100 may be driven in a battery charge/discharge mode or the normal mode.

When the first converter 100 is driven in the battery charge/discharge mode while the power system 10 is connected thereto S120, the first converter 100 analyzes the SOC information of the battery 180 S140.

In detail, the first converter 100 may receive the SOC information of the battery 180 from the communicator 300 in real time and analyze the SOC information of the battery 180.

When the SOC information of the battery 180 is analyzed S140, the first converter 100 may determine whether the SOC of the battery 180 is within a predefined limit range S160.

In detail, the first converter 100 may determine whether the SOC of the battery 180 is included within the predefined limit range, that is, a range between a SOC minimum value (SOC_Min) and a SOC maximum value (SOC_Max), based on the analysis result.

When, from a result of the determination, the SOC of the battery 180 is included within the predefined limit range, the first converter 100 may generate a power control command P* in consideration of the charge or discharge power of the battery 180 and the consumption powers of the first and second loads 230 and 280.

In this connection, the power control command P* may refer to, for example, a sum of the consumption power amounts P_Load of the first and second loads 230 and 280 and the charge or discharge power amount P_Battery of the battery 180.

Further, the first converter 100 may transfer the generated power control command P* to the second to fourth converters 150, 200, and 250 through the communicator 300.

Further, the first converter 100 may perform power control of the power system 10 based on the generated power control command P*, as shown in FIG. 3.

For example, when charge of the battery 180 is required, the power of the power system 10 may be provided to the battery 180 based on the generated power control command P*. When discharge the battery 180 is required, the discharged power of the battery 180 may be provided to the power system 10 based on the generated power control command P*.

That is, as described above, the first converter 100 may allow a power transaction operation between the power system 10 and the battery 180 to be performed based on the power control command P*.

In another example, the second converter 150 may control charge/discharge of the battery 180 based on the power control command P* provided from the communicator 300.

Further, the first converter 100 may supply the power of the power system 10 to the first and second loads 230 and 280 based on the generated power control command P*.

In another example, the third and fourth converters 200 and 250 may control voltages of the first and second loads 230 and 280 based on the power control command P* provided from the communicator 300.

To the contrary, when the SOC of the battery 180 is out of the predefined limit range, the first converter 100 may be driven in the normal mode S200.

In detail, the first converter 100 may be driven in the normal mode to generate the power control command P* with considering the consumption powers of the first and second loads 230 and 280.

In this connection, the power control command P* may refer to, for example, the consumption power amounts P_Load of the first and second loads 230 and 280.

Further, the first converter 100 may transfer the generated power control command P* to the second to fourth converters 150, 200, and 250 through the communicator 300.

Further, first converter 100 may perform power control of power system 10 based on the generated power control command P*, as shown in FIG. 4 S220.

For example, when the SOC of battery 180 is outside the predefined limit range, the charging and discharging of the battery 180 is interrupted. The first converter 100 may supply the power of the power system 10 to the first and second loads 230 and 280 based on the generated power control command P*.

In another example, the third and fourth converters 200 and 250 may control voltages of the first and second loads 230 and 280 based on the power control command P* provided from the communicator 300.

However, when the first converter 100 determines whether the power system 10 is connected thereto S100, the power system 10 has an accident, that is, the power system 10 is interrupted or disconnected. In this case, the first converter 100 turns off a gate signal and stops the operation. The second converter 150 may supply the power of the battery 180 seamlessly to at least one of the first load 230 and the second load 280 S240.

Specifically, even when the power system 10 and the DC distribution network 20 are disconnected from each other due to the failure of the power system 10, the second converter 150 always controls the voltage of the DC distribution network 20. Thus, the power of the battery 180 may be supplied to at least one of the first load 230 and the second load 280 without delay, that is, in a seamless manner.

As mentioned above, according to the present disclosure, the seamless power supply may be realized. The charge/discharge control of the battery 180 may be realized constantly. Thus, the exchange of the power with the power system 10 may be realized and the high quality power may be supplied in a seamless manner.

The present disclosure as described above may be subjected to various substitutions, modifications, and changes by a person having ordinary knowledge in the technical field to which the present disclosure belongs without departing from the technical spirit of the present disclosure. Thus, the present disclosure is not limited by the accompanying drawings.

What is claimed is:

1. An energy storage system for managing a power of a power system and a power of a direct current (DC) distribution network connected to the power system, wherein the energy storage system includes:

a first converter connected to and disposed between the power system and the DC distribution network, wherein the first converter is configured to convert an alternating current (AC) voltage of the power system into a DC voltage and deliver the DC voltage to the DC distribution network;

a second convertor connected to the DC distribution network, wherein the second converter is configured to control a voltage of the DC distribution network;

a battery connected to the second converter, wherein charge and discharge of the battery are controlled by the second converter;

a third converter connected to the DC distribution network;

a first load connected to the third converter, wherein a voltage of the first load is controlled by the third converter, wherein the first converter is configured to generate a power control command for controlling at least one of the battery or the first load based on state of charge (SOC) information of the battery and consumption power information of the first load;

a communicator configured to: receive the SOC information of the battery from the second converter and the consumption power information of the first load from the third converter, transmit the SOC information and the consumption power information to the first converter, receive the power control command from the first converter, and transmit the power control command to at least one of the second converter and the third converter; and a main controller configured to control and monitor the first to third converters through the communicator.

2. The energy storage system of claim 1, wherein the energy storage system further includes:

a fourth converter connected to the DC distribution network; and a second load connected to the fourth converter, wherein a voltage of the second load is controlled by the fourth converter.

3. The energy storage system of claim 2, wherein the fourth converter transmits consumption power information of the second load to the communicator, wherein the communicator transmits the consumption power information of the second load to the first converter, wherein the first converter is configured to generate the power control command for controlling at least one of the battery, the first load, or the second load based on the SOC information of the battery, the consumption power information of the first load, and the consumption power information of the second load, wherein the communicator is configured to receive the power control command for controlling the at least one of the battery, the first load, or the second load from the first converter, and to transmit the power control command to at least one of the second to fourth converters, wherein the main controller controls and monitors the fourth converter.

4. The energy storage system of claim 2, wherein the second converter is configured to convert a DC voltage provided from the DC distribution network into a DC voltage and supply the converted DC voltage to the battery, or to convert a DC voltage provided from the battery into a DC voltage and supply the converted DC voltage to the DC distribution network, wherein the third converter is configured to convert a DC voltage provided from the DC distribution network to a DC voltage and supply the converted DC voltage to the first load, wherein the fourth converter is configured to convert a DC voltage provided from the DC distribution network into an AC voltage and supply the converted AC voltage to the second load.

5. The energy storage system of claim 1, wherein when the first converter is driven in a battery charge and discharge mode while the first converter is connected to the power system, the first converter is configured to analyze the SOC information of the battery provided from the communicator and determine whether the SOC of the battery is within a predefined limit range, wherein the first converter is configured to generate the power control command based on the determination.

6. The energy storage system of claim 5, wherein upon a determination that the SOC of the battery is within the predefined limit range, the first converter is configured to:

generate the power control command based on charge or discharge power of the battery and the consumption power information of the first load;

deliver the generated power control command to the second converter and the third converter via the communicator; and perform power control of the power system based on the generated power control command.

7. The energy storage system of claim 5, wherein upon a determination that the SOC of the battery is out of the predefined limit range, the first converter is configured to:

operate in a normal mode to generate the power control command based on the consumption power information of the first load;

transfer the generated power control command to the third converter via the communicator; and perform power control of the power system based on the generated power control command.

8. The energy storage system of claim 1, wherein when a failure occurs in the power system: the first converter is configured to stop operation thereof, and the second converter is configured to supply the power from the battery to the first load in a seamless manner.

\* \* \* \* \*